May 1, 1951 W. D. RABER 2,550,938
METHOD AND MEANS FOR MOLDING PORCELAIN CASTS
Filed July 25, 1947

INVENTOR.
WALTER D. RABER.
BY Robert H. Jacob
AGENT.

Patented May 1, 1951

2,550,938

UNITED STATES PATENT OFFICE 2,550,938

METHOD AND MEANS FOR MOLDING PORCELAIN CASTS

Walter D. Raber, Chicago, Ill.

Application July 25, 1947, Serial No. 763,714

4 Claims. (Cl. 18—34.1)

The present invention relates to a method of making artificial teeth and similar molded articles from porcelain or other ceramic pastes and means for molding such articles as true replicas of the master patterns which are employed to make the negative cavities in the molds wherein these articles are cast.

In the art of dentistry it is common practice to cast porcelain teeth from a mixture of finely ground porcelain and a suitable binder in cavities provided in soft and flexible molds, which cavities are shaped to present the negative outline of the teeth to be formed therein. The molds are constituted of such mold materials as gelatin, rubber, plasticized vinyl chloride such as marketed under the name "Korojel" or any similar substances which, upon heating, become sufficiently fluid to be poured into molding boxes wherein the master patterns are supported, and which, at ambient temperature gel around the master patterns to a flexible consistency in which they retain the form to which they have been cast.

The porcelain casts, upon being poured into the cavities of the flexible molds are dried by subjecting them while in the mold cavities to prolonged gentle vibration or centrifugation. Upon drying, the hardened casts, which are brittle, are removed from the molds and baked in a kiln to a hard porcelain consistency.

It has been the aim of men skilled in the art of dentistry to make teeth having retention means molded integrally with the teeth rather than teeth requiring separate retention means for holding them securely to the bases in which they are set. Such teeth are generally referred to as pinless teeth. Owing to the absence of separate retention means in pinless teeth, such teeth are homogeneous structures which can be formed to more closely resemble natural teeth than any other ceramic or porcelain teeth heretofore known.

To make possible the casting of such pinless ceramic teeth, the flexible molds referred to above are generally relied on, first, because they can be more rapidly and economically produced than solid or hard molds; second, because in them the outlines for the inherent retention means can be easily reproduced; and third, because the flexible material permits the reproduction of more intricate shapes and impressions while favoring the removal of the casts with a modicum of breakage. However, it has been found necessary to use a very soft grade of flexible material for such molds as the harder grades of such material, while still flexible, do not yield sufficiently to permit the removal without breakage of the pinless tooth casts, which are provided with retention grooves, recesses and serrated surfaces, for which corresponding projections extend into the mold cavities.

Even if the molds are split along a plane passing substantially centrally through the axes of the mold cavities, the projections present serious obstacles to the removal of the casts. Therefore, it is common practice to use the softest flexible material which will retain permanent impressions for molds of this type.

However, the soft molds have the serious shortcoming that they yield to the weight of the soft pastes poured into them. The walls of the cavities in the molds yield, and the softer the mold material, the more they yield. This makes it impossible to form teeth or other articles in them which have relatively plane or only slightly curved surfaces. It is invariably found that such surfaces become considerably more convex or less concave, as the case may be, than intended. Moreover, the expanding walls of such soft molds make it difficult to reproduce the exact size of casts desired.

This disfiguring takes place to a considerable extent while the casting paste is being poured into the mold cavities and the mold is at rest. Since it is necessary or advantageous in order to expedite the drying of the cast material, to vibrate the mold continuously or to subject it to centrifugal motion the deviations from the true intended form of the cast articles are even more accentuated. Consequently the teeth made by the known processes of molding the casts in the molding cavities of rubber or plasticized vinyl chloride molds are frequently so deformed as to lose their intended appearance so that they do not truly resemble natural teeth. This is particularly objectionable in the case of front teeth which are visible in the wearer's mouth.

The aforesaid deformities not only occur in the side surfaces of the teeth, but also at the incisal edges. As these edges are lowermost in the cavities while the material is being cast the weight of the material cast on top of them, the pressure of the packing of the material into the molds and the continuous vibration during drying have the effect of broadening the section between the lingual and labial lower surfaces, thereby rendering the edges curved at both sides rather than sharp. This broadening cannot be prevented as the soft mold material necessarily yields on both sides of the incisal edge.

The method and means in accordance with the present invention have made it possible to overcome the aforesaid difficulties and obstacles. The present invention, therefore, provides an improved method and means for forming teeth and other articles from ceramic pastes in flexible molds and drying them therein while maintaining their shapes true to those of the patterns, and for allowing their removal from the mold cavities without damage to the casts.

As explained hereinabove, the reason for using a soft mold for molding the ceramic casts in the production of artificial teeth is to permit their removal from the mold cavities without breakage. Consequently, it has never been considered feasible heretofore to make the casts in a mold made of a hard grade of flexible mold material.

Nevertheless, I have discovered a method and means enabling the casting of ceramic pinless teeth having homogeneous retention means, or similar articles, in a mold made substantially entirely of flexible mold material of a very hard grade, the walls of which do not noticeably yield to the weight of the casts poured into them. This makes it possible to produce casts which are true likenesses of natural teeth, and which can be removed from the mold cavities without undue breakage. Moreover, my method and means reduce the time required for the molding of pinless ceramic teeth from the period of two to three hours necessary when a mold of soft grade material is used, to a period of only ten to twenty minutes.

In accordance with my method I provide a mold which is composed of hard grade flexible mold material throughout, except for the projections which produce the proximal ducts, grooves and channels constituting the retention means, as well as any undercuts, which portions I make of a very soft grade of material. The walls of such a hard mold yield but very little when the molding paste is poured into the cavities and when for the purpose of packing or condensing and drying the casts therein the mold is subjected to the vibrating or centrifuging. In fact, with my mold it is not only possible to expose the casts to the usual vibrating or centrifuging, but owing to the substantially non-yielding walls of my mold it is possible to simultaneously tamp and centrifuge the casts and the mold without producing noticeable deformities in the casts. The simultaneous tamping and centrifuging accelerates the drying of the casts in that by virtue of the tamping the ceramic material settles very rapidly in the cavities while the liquid of the binding substances rises to the top where it is eliminated by evaporation which is speeded up by the centrifugal motion. If too much liquid is present at the top of the cavity during the first part of the centrifuging, it is, of course, also possible to remove such liquid with a suction tube.

The invention will now be described in greater detail with reference to the accompanying drawings in which.

Figure 1:
Fig. 1 is a lingual or rear elevation of a master pattern for a tooth of the type herein discussed.
Figure 2:
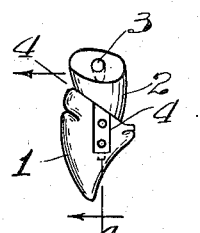
Fig. 2 is a side elevation of the tooth shown in Fig. 1 taken from the left side thereof.

As the figures of the drawing serve merely for illustrative purposes and the molds and casts may vary within wide limits they are not drawn to any specific scale. To make a mold in accordance with the present invention, a master tooth according to Fig. 1, which consists of a tooth portion 1 and a neck portion 2, is first provided with a mold section of soft mold material, as indicated by 5 in Figs. 5, 6 and 7. The soft material of this mold section enters the retention recesses 4 in the master tooth and forms small flaps 6 in the soft mold 5, which flaps have a profile corresponding to the recesses 4.

Figure 5:
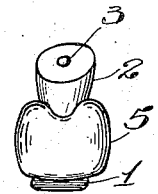
Fig. 5 is a view of the master tooth as shown in Fig. 1 with the soft mold material 5 in place thereon.
Figure 6:
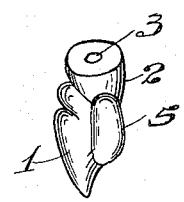
Fig. 6 is a view of the tooth shown in Fig. 5 taken from the left side thereof.
Figure 7:
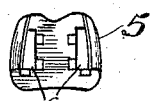
Fig. 7 is a rear view of the soft mold material 5 illustrating as clearly as possible the projections which provide for the retention channels and cavities in the casts.

To form the mold of soft material on the master tooth, the tooth is heated over the flame of a Bunsen burner. Melted soft material in small quantities is poured into the recesses 4 forming the retention means and upon any undercuts. Care is taken that the mold material flows into all channels, ducts and tubular portions of the retention cavity so that ultimately the finished mold will have the little flaps 6 as true replicas of the recesses or retention means. Additional mold material is then applied to the heated master pattern to connect the flaps on the two sides across the lingual surface of the tooth and to form small paddings at both sides, thus forming the soft mold 5 substantially as illustrated in Figs. 5, 6 and 7.

Figure 9:
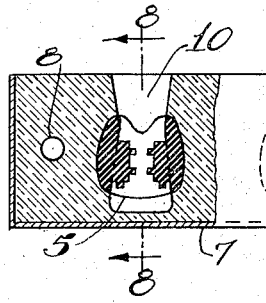
Fig. 9 is a longitudinal sectional view of the mold of Fig. 8 taken along the line 9—9.
Figure 8:
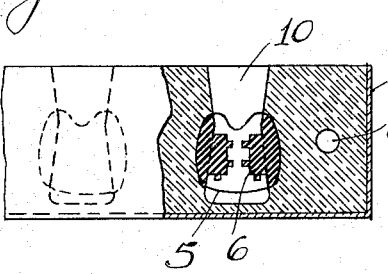
Fig. 8 is a cross-sectional view of a mold taken along the line 8—8 of Fig. 9, showing the soft mold material forming the retention means in a mold of hard flexible mold material.
Figure 8:
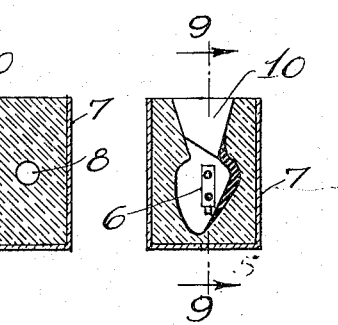

The master pattern with the soft mold on it is now suspended in a form, preferably one which is elongated and of rectangular shape, and which has five sides and is open at the top as indicated at 7 in Figs. 8 and 9. A form of sufficient length to accommodate a multitude of master patterns is most desirable. However, single molds can be made. To suspend the pattern in the form, a rod or screw, which projects at right angles through a small plate is fastened in any convenient manner into the aperture 3, in a manner to substantially constitute a T. The metal plate is then placed with its ends on the two long sides of the mold, with the pattern projecting down into the form. As these means are conventional, they are not discussed in greater detail here.

Upon placing one or more master patterns into the form the hard flexible mold material is heated to fluid consistency and poured around the patterns into the form until it fills the form substantially to the top. The mold material is then allowed to cool and harden, whereupon the flexible mold is removed from the forming box and the master patterns are carefully removed from the mold, thereby leaving cavities 10 which constitute the outlines of the master patterns, and projections 6 which form the recesses and undercuts in the casts which are to be formed in the cavities.

In this manner a relatively hard pliable mold is formed of which those portions which project into the cavities, any undercuts, and small sections adjacent the lingual surface outlines and the sides of the cavities, are of very soft material. The soft material which enters into the recesses in the master pattern, and which molds the recesses in casts made in the mold cavities, being very pliable and resilient, makes it possible to remove the master patterns or the casts from the cavities without damage to the mold or to the casts.

Depending upon the nature of the pattern, it may be desirable or necessary to split the mold longitudinally along a line extending through the cavities approximately to the depth of the bottom of the cavities; but not completely through the mold, to keep the separated portions of the mold and cavities in perfect alignment. Under most conditions, this greatly facilitates the removal of the master patterns and casts from the mold cavities.

The mold can now be used for making the casts. I have found it desirable for this purpose to support the two long sides of the mold by means of two metal plates or the like which I fasten to the mold by means of screws or bolts which pass through the holes 8 provided in the mold and in the side plates. This makes the mold very rigid and easy to handle during casting operations. If desired, two or three such molds may be held between the metal plates, with a further plate between each two molds thus held together.

The mold is now securely fastened circumferentially of the plate of a centrifuge. As stated hereinabove, the walls of the cavities are firm owing to the hardness of the mold material employed. The moist mixture of casting material or paste, constituted of powdered porcelain or the like and a suitable binder, is poured into the cavities in small doses. Despite the weight of the casting material, the walls of the mold do not yield in any direction owing to the hardness of the flexible mold material notwithstanding any parts of thin soft lining material. The centrifuge is now rotated at moderate speed to promote the evaporation of the liquid in the binder of the casting material which rises to the top as the heavier solid material settles down in the cavity where it gradually becomes firmly packed. I have found that the settling and packing of the solids in the casting material can be greatly accelerated by tamping while the centrifuge is in rotation. For that purpose I employ a centrifuge, the center portion of which rides above a cam which slowly raises and abruptly drops the rotating disk of the machine.

At intervals depending upon the rapidity of the drying process, ranging from approximately two to four minutes, the rotary motion is stopped and additional casting material is placed into the mold cavities, whereupon the centrifuging and tamping is resumed. If too much liquid accumulates on top of the solid material in the cavities, it is removed with a suction tube in order to expedite the drying.

Figure 3:
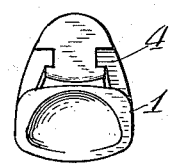
Fig. 3 is a view of a porcelain cast of a tooth made in accordance with the above master pattern, after the neck portion 2 has been cut away.
Figure 4:
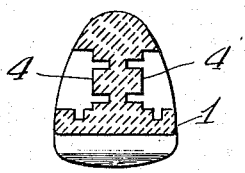
Fig. 4 is a sectional view of tooth portion 1, taken along line 4—4 of Fig. 2 showing the retention recesses.

When the casts in the mold cavities are dried to such an extent that they are firm, they are removed by spreading the tops of the cavities apart and allowing them to fall out. The neck portions 2 are then carefully and smoothly cut off along a diagonal line in a well known manner to form the teeth of a shape such as indicated in Fig. 3. It is desirable then to place the casts without delay into a kiln for firing at the required temperature, which depends on the type of ceramic material.

This method results in products which very accurately correspond to the form of the master paterns as the molds, although flexible, do not yield noticeably to the weight of the charges cast in them.

In carrying out my process I have also found it expedient to not only fill in the recesses and undercuts in the master pattern with the soft flexible mold material as explained hereinabove, but to cover also all of the remaining surfaces of the pattern with a thin coat of soft material. This may be found desirable where many irregularities and small grooves exist in the surfaces of the master pattern. The hard mold is then formed around the soft mold thus formed, and this results in a mold which has a complete soft lining and which is highly satisfactory for my process of making small ceramic casts.

The definitions "soft" and "hard" as used herein to specify the type of flexible mold material relate to an extremely soft plasticized vinyl resin material as marketed under the name "Korojel," which I have frequently used for my molds, and to the harder commercial grade of such material which is relatively stiff.

Having thus described my method and the means for executing the same, I do not wish to be limited to the specific examples set forth herein, as modifications within the scope of this disclosure may occur to those skilled in the art; but what I desire to protect by Letters Patent is set forth in the following claims.

I claim:

1. The method of making a flexible mold for molding porcelain casts for artificial teeth therein true to the form of the master pattern, said method comprising the steps of forming upon the master pattern a partial mold section of relatively soft flexible mold material bearing recessions and projections defining the recesses and adjacent irregular surface portions in the master pattern and of completing the mold by forming externally of said partial mold of soft material and over the surfaces of the master pattern not yet covered a mold of relatively firm flexible mold material defining also the surfaces of the master pattern not defined by said soft mold, thereby constituting a mold cavity defining the irregular surfaces and projections by means of relatively soft flexible mold material and the continuous surfaces by means of relatively hard flexible mold material.

2. A flexible mold for forming porcelain casts for artificial teeth comprising a section of relatively soft flexible material bearing recessions and projections for forming the recesses and adjacent surface areas in said casts and a section of relatively firm flexible material having a cavity corresponding to the surfaces and portions of said cast not defined by said relatively soft section and to the back of said soft section, said soft section being embedded in said cavity.

3. A flexible mold for forming porcelain casts for artificial teeth, comprising a partial inner lining of relatively soft flexible material bearing recessions and projections outlining the recesses and adjacent surface areas in said casts and an outer mold of relatively firm flexible material surrounding the back of said inner lining and supporting the same and defining the remaining surface areas of said casts.

4. A flexible mold for forming porcelain casts for artificial teeth, said mold having an outer section of relatively firm flexible material provided with a cavity defining the surfaces of a tooth and a section of relatively soft flexible material defining recesses and undercut portions in said cast which serve to secure the tooth in a plate, said section of relatively soft flexible material being supported by said outer section in a manner to extend into said cavity.

WALTER D. RABER.

REFERENCES CITED

The following references are of record in the file of this patent:

UNITED STATES PATENTS

| Number | Name | Date |
|---|---|---|
| 1,983,602 | Daubenmeyer | Dec. 11, 1934 |
| 2,083,484 | Zampol | June 8, 1937 |
| 2,152,738 | Jeffery | Apr. 4, 1939 |
| 2,181,694 | Felcher | Nov. 28, 1939 |
| 2,196,258 | Erdle | Apr. 9, 1940 |